July 30, 1963 P. F. McADAMS 3,099,327
TWO SPEED POWER STEERING
Filed Jan. 24, 1957 3 Sheets-Sheet 1
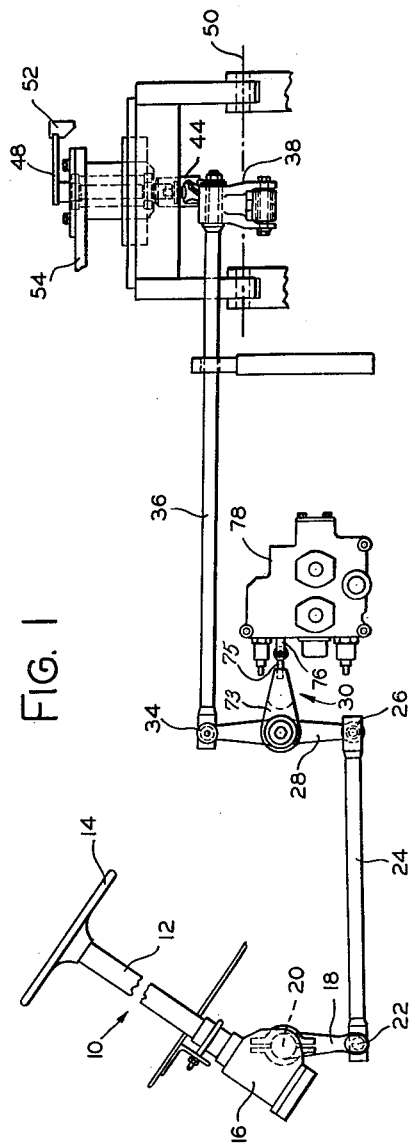
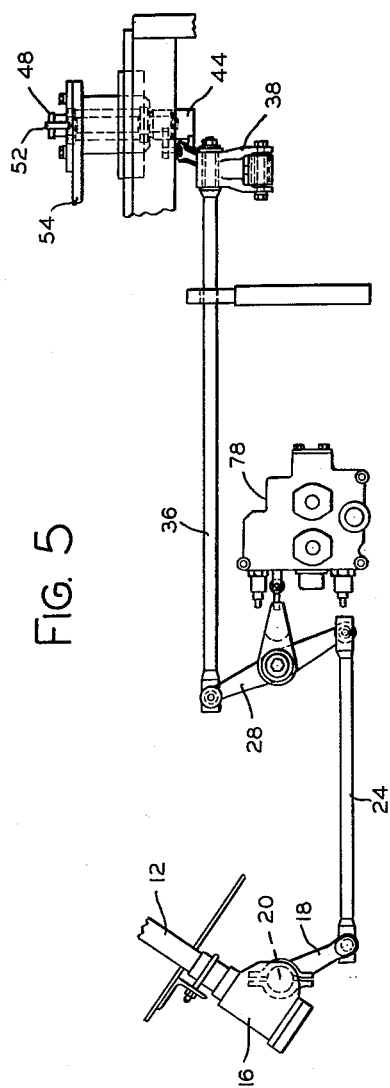
INVENTOR.
PAUL F. McADAMS
BY Kenneth C. Witt
ATTY.

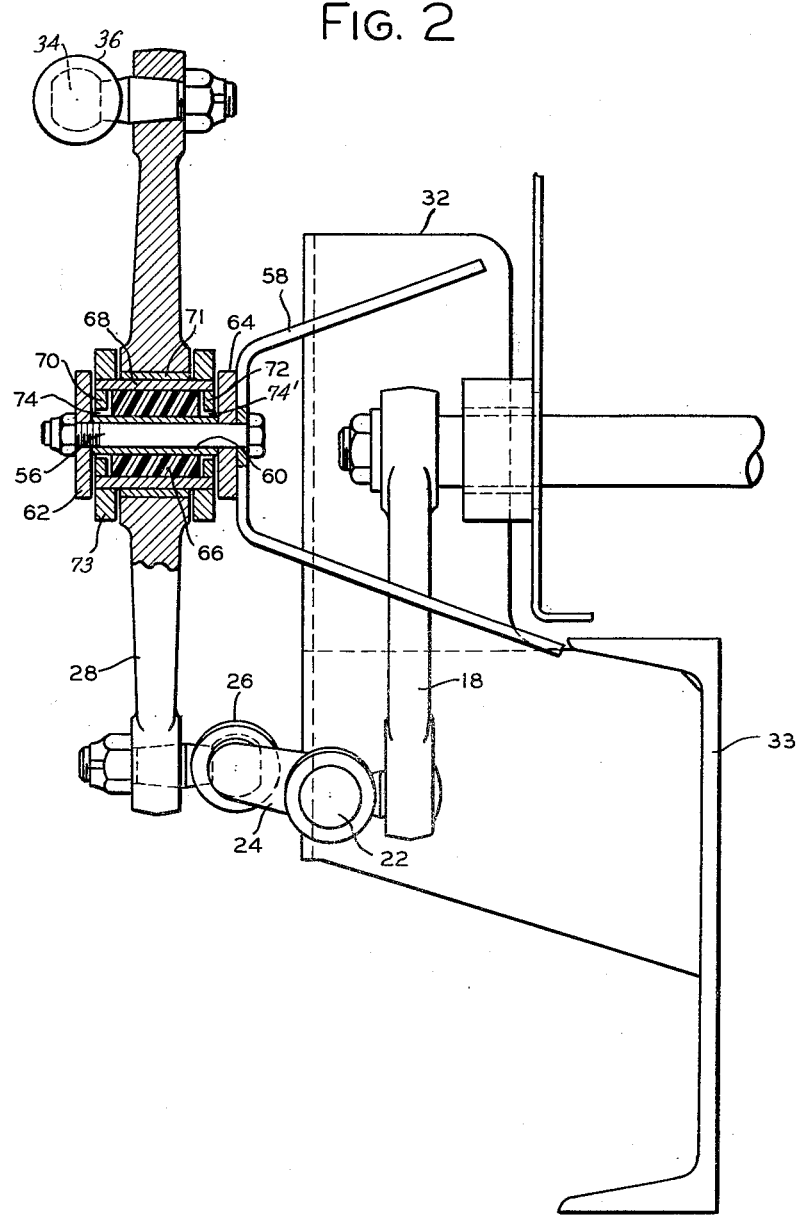

July 30, 1963   P. F. McADAMS   3,099,327
TWO SPEED POWER STEERING
Filed Jan. 24, 1957   3 Sheets-Sheet 3

INVENTOR.
PAUL F. McADAMS
BY
Kenneth C. Witt
ATTY.

United States Patent Office 3,099,327
Patented July 30, 1963

3,099,327
TWO SPEED POWER STEERING
Paul F. McAdams, St. Joseph, Mich., assignor to Clark
Equipment Company, a corporation of Michigan
Filed Jan. 24, 1957, Ser. No. 636,017
3 Claims. (Cl. 180—79.2)

This invention relates to power steering apparatus, and more particularly to power steering apparatus in which two different speeds of steering are provided to meet varying operating conditions. The apparatus disclosed herein is of the type in which a servo motor is utilized to steer a vehicle, with the operation of the servo motor being controlled by a pilot mechanism which is responsive to movements of the vehicle operator's steering wheel.

It is desirable in many large highway and off-the-road vehicles to provide a steering mechanism which permits turning the vehicle at different rates under varying conditions. When the vehicle is being operated at a relatively slow speed it may be desirable to be able to turn the vehicle quickly in order to be able to maneuver it with maximum facility. On the other hand, when the vehicle is operating at relatively high speed it is desirable to have the steering apparatus operate at a relatively slow speed for maximum sensitivity and ease of steering and to make it easy for the operator to avoid over-steering.

The object of the present invention is to provide a two-speed power steering apparatus which automatically produces high speed and low speed steering as conditions warrant when the vehicle driver operates the manual steering wheel of the vehicle in the normal manner.

In carrying out my invention in one form I provide in a vehicle power steering mechanism a fluid motor for steering the vehicle and two pumps for supplying fluid under pressure to operate the fluid motor. A valve actuator is arranged on the vehicle to connect one or both of the pumps to the motor depending on whether the actuator moves a small amount or a larger amount. The valve actuator and a pivoted lever associated therewith are mounted on the vehicle by means of a yieldable connection. The lever member is connected to the operator's steering wheel and also has a follow-up connection to a portion of the vehicle which moves during steering. A relatively small movement of the steering wheel by the vehicle operator causes only one pump to be connected to the fluid motor which turns the vehicle at a low rate, but a sudden or strong movement of the steering wheel by the vehicle operator causes both pumps to be connected to the servo motor and the vehicle to be turned at a higher rate.

Figure 4:
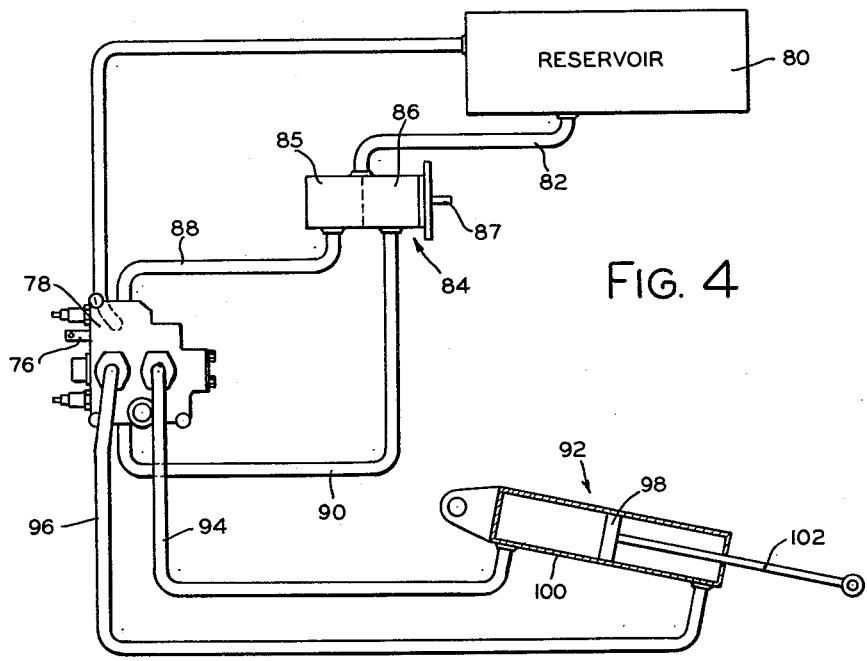
Figure 3:
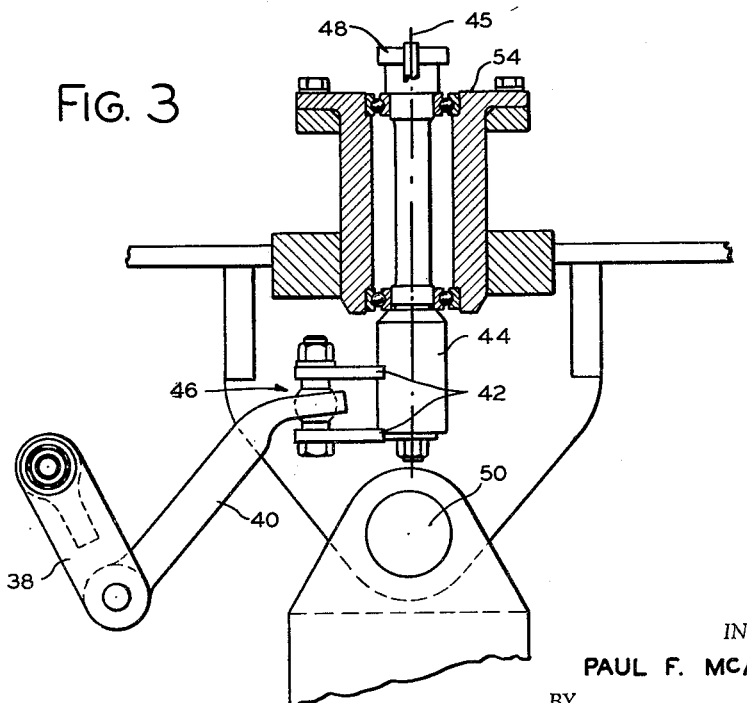

For a clearer and more complete understanding of my invention, reference should be had to the accompanying drawing in which FIGURE 1 is a side elevational view of a preferred form of the invention, FIGURE 2 is a transverse sectional view through the lever forming one element of the apparatus, FIGURE 3 is an end elevational view of the rear portion of the apparatus of FIGURE 1, FIGURE 4 shows a typical fluid circuit for my invention, and FIGURE 5 is a view showing the apparatus of FIGURE 1 in a different operational position.

Referring to the drawing I have indicated by the numeral 10 in FIGURE 1 a conventional type steering column for a vehicle. The steering column includes an enclosure 12 with an operator's steering wheel 14 mounted at the upper end thereof. The operator's steering wheel 14 is secured to a shaft (not shown) within enclosure 12 and operates a conventional worm gear mechanism housed within the lower enlarged portion 16 of the housing to move a pitman arm or lever 18 clockwise or counterclockwise about pivot point 20 as the operator's steering wheel is turned one way or the other from the straight-ahead position. The pitman arm 18 is connected by means of a ball joint at 22 to a drag link 24, while the opposite end of the drag link is connected by means of a ball joint 26 to the lower end of a pivoted lever 28.

Lever 28 and an actuator member indicated generally by the numeral 30 are yieldably connected to the frame or other fixed portion 32 (see FIGURE 2) of the vehicle. In this case portion 32 is fixed to member 33 which is one of the main structural members of the frame. The details of the connection between lever 28 and the actuator member and the connection between these parts and the fixed portion of the vehicle are described in detail hereinafter in connection with FIGURE 2.

The upper end of lever 28 is connected by a ball joint 34 to a rod or link 36 which provides a follow-up connection. The opposite end of link 36 has a bifurcated clevis member 38 pivotally mounted thereon to pivot about the longitudinal axis of the link. As best seen in FIGURE 3, an arm member 40 is connected between the lower end of clevis member 38 and a bracket portion 42 on a vertically disposed member 44, arm 40 being connected to bracket 42 by means of a ball joint at 46.

Member 44 is pivotable about its vertically disposed axis 45 responsively to turning movement of the vehicle, a lever portion 48 located at the upper end of member 44 being connected to a portion 52 of the vehicle which moves relative to a portion 54 of the vehicle when the vehicle is steered. The apparatus described and illustrated herein is for use with an articulated or "fifth wheel" type vehicle in which a centrally located combined draft and coupling mechanism connects the forward or tractor portion of the vehicle with the rearward or trailer portion. In this case axis 45 is the steering axis of the vehicle and 52 is a part of the trailer portion of the vehicle, while part 54 is mounted on the tractor portion. In this instance provision is made also for portion 54 to pivot about a longitudinal horizontally disposed axis 50 and it is for this reason that clevis member 38 and arm 40 are provided between link 36 and bracket 42. Elements 38 and 40 permit pivoting of members 44 and 54 and the parts connected thereto about the longitudinal horizontally disposed axis 50 without changing the position of rod 36, while pivoting movement of member 44 about the vertical axis 45 causes fore and aft movement of rod 36. It will be understood that clevis 38 is movable on rod 36 only about the axis of the latter and that when clevis 38 is pushed forwardly or rearwardly by the action of bracket 42 on arm 40 that rod 36 also is pushed forwardly or rearwardly.

Referring again to FIGURE 2 of the drawing, the yieldable connection between lever 28 and valve actuator 30 and the fixed portion of the vehicle includes a cylindrical pin member, shown in FIGURE 2 as a bolt 56 which is secured to a bracket member 58, the latter being in turn secured to member 32 which is mounted on the frame of the vehicle. A sleeve or bushing member 60 of wear resistant material may be provided around pin 56 to provide a bearing surface and also serve as a spacer between a pair of retaining members or washers 62 and 64.

Located around sleeve member 60 in contiguous relation therewith is a resilient annular member 66 of rubber or other suitable resilient material. Surrounding resilient member 66 is a solid annular member 68 which has a pair of inwardly extending flange portions 70 and 72 at the ends thereof. These flange portions may be made conveniently as washers and assembled with the cylindrical portion of member 68 to form a unitary structure by means of a press fit, after resilient member 66 has been put in place between the two flange portions. A small clearance indicated by the spaces 74 and 74' respectively is provided between the inner circular surfaces of flange portions 70 and 72 and the annular or sleeve member 60 for a purpose which is discussed hereinafter.

Lever 28 pivots on sleeve member 68 and a lining 71 of nylon or other suitable wear resisting material may be provided between these two members. A clevis member 73 which forms a portion of valve actuator 30 also is positioned around sleeve member 68, and member 73 preferably is arranged so that it pivots slightly with respect to sleeve 68 if necessary.

Actuator 30, described and illustrated herein as a valve actuator, includes a rod 75 (see FIG. 1) which is connected to clevis 73 at one end and to a plunger member 76 at the other. Plunger 76 forms a portion of a valve mechanism 78 of a known type which has valves therein arranged to connect one or two pumps or other sources of fluid pressure to the fluid servo motor which accomplishes the steering of the vehicle.

As plunger 76 moves a predetermined amount in either direction from its neutral position it connects one source of fluid pressure to the servo motor, while if the plunger is moved more than the predetermined amount in either direction the result is that two fluid pressure sources are connected to the servo motor simultaneously. In a typical case the first .047 inch of movement of the plunger connects one pump or fluid source to the fluid motor, while the second .047 inch of travel connects the second pump also so that the two pumps jointly supply the fluid motor.

A typical hydraulic circuit which may be employed is shown in FIGURE 4 of the drawing. Oil or other fluid is drawn from a reservoir 80 through a section line 82 by a double pump 84 which in effect is two pumps in a single casing. It will be appreciated, of course, that two separate pumps may be employed, if desired. As illustrated, the left portion 85 of the pump represents the low volume portion and in a typical case this part of the pump supplies 38% of the total capacity of the two pumps combined. The right portion 86 in the same case supplies 62% of the total volume. It will be appreciated, of course, that the pump is operated by a suitable motor or connection to the vehicle prime mover, by means of a shaft 87.

The output of the low volume portion of the pump enters valve mechanism 78 through a conduit 88, while the output of the high volume portion of the pump enters the valve mechanism through conduit 90. Then, depending upon the position of the plunger 76, none, one or both of the pumps are connected to hydraulic motor 92 by means of conduit 94 or conduit 96, with the other conduit serving as the return line. As illustrated herein motor 92 is of the piston and cylinder type, comprising a cylinder 100 having a piston 98 therein connected to a piston rod 102, and it will be readily understood that this motor provides for steering of the vehicle by pivoting one portion of the vehicle with respect to another or by pivoting the wheels with respect to the fixed portion of the vehicle. While a single servo motor is illustrated herein it will be appreciated that two or more such motors may be employed; and Patent 3,032,135 McAdams, which is assigned to the same assignee as the present patent, illustrates a vehicle of the type mentioned which is equipped with two steering servo motors.

In operation, as steering wheel 14 is turned, pitman arm 18 moves drag link 24 which tends to pivot lever 28 about joint 34. Such operation moves valve actuator 30. The initial movement of valve actuator 30 connects pump portion 85 to the motor 92 and initiates the steering action of the vehicle. Such steering action moves portion 52 of the vehicle which, through linkage 48, 44, 40, 38, moves rod 36 in the opposite direction to the movement of rod 24. This moves pivot point 34 and tends to restore valve actuator to its initial position, and if the movement of wheel 14 is stopped the valve actuator will be restored to its initial position and steering movement of the vehicle will cease. However, if motion of steering wheel 14 is continued the steering motion of the vehicle likewise will continue. Furthermore, if the motion of steering wheel 14 is increased to cause a greater movement of valve actuator 30 sufficient to connect the second pump to the fluid motor, the rate of steering movement will be increased due to the added fluid supplied by the second pump. I have illustrated in FIGURE 5 of the drawing the positions assumed by the various parts of the steering apparatus when a sharp turn is being made (to the left).

It will be understood that when wheel 14 is rotated in the opposite direction opposite movement of the parts, including valve actuator 30, occurs. This causes valve mechanism 78 to direct fluid to the opposite end of double acting motor 92 and reverse the direction of steering of the vehicle. In this direction of steering also the rate of steering is dependent upon the speed or force of turning of the operator's steering wheel 14. If this wheel is turned hard enough or fast enough to overcome sufficiently the resistance of resilient member 66 the higher rate of steering will be effected. It will be appreciated, of course, that the deformation characteristics of the material selected for member 66 must be such as to permit only one pump to be connected to the servo motor for a slow or relatively weak movement of steering wheel 14 and to permit both pumps to be utilized when the steering wheel is moved with sufficient vigor to justify the higher rate of steering. It will be understood that the valve actuator 30 is moved as a result of sleeve member 68 moving to an eccentric position with respect to pin 56 due to the deformation of resilient member 66. The inwardly projecting flange portions 70 and 72 on sleeve member 68 preferably have inner diameters which exceed the outer diameter of bearing or bushing member 60 by twice the one-way movement of valve actuator 30 (or in other words the difference in the diameters is equal to the total movement of valve actuator 30 between the position for highest rate of steering in one direction and the position for the highest rate in the other direction). Thus, flange portions 70 and 72 provide stops to limit the movement of valve actuator 30.

It will be understood by those familiar with apparatus of the character shown herein that valve mechanism 78 may be arranged to provide "feathering" or gradual action of one or both of the valves therein or these valves may be designed to be either fully open or fully closed with no intermediate operating positions. In one typical apparatus I use a valve for low volume pump portion 85 which provides an infinite range of operating positions between closed and open whereby the volume of fluid admitted to motor 92 varies responsively to the speed of turning movement of wheel 14. In this same typical apparatus, however, pilot operation is provided for the valve which controls the flow from high volume pump portion 86 whereby this latter valve has only two operating positions fully closed and fully open. If actuator 30 is moved beyond a predetermined position, the full flow of pump portion 86 is directed to the fluid motor 92, and since pump portion 85 is already supplying its entire output to the motor 92 at this time, steering movement will be at the maximum rate as long as this condition is maintained. In the typical steering apparatus just described, therefore, steering movement of the vehicle is relatively slow and is fully responsive to the speed of movement of steering wheel 14 until a predetermined speed of movement of steering wheel 14 is exceeded and thereafter maximum speed of steering of the vehicle is achieved. Such operation has been found to be eminently satisfactory for numerous vehicles.

I have found that my steering apparatus makes it unnecessary to have a force limiting device in drag link 24, such as is used in many other steering apparatuses to prevent overstressing of the parts under abnormal conditions of operation. The stop means provided by flanges 70 and 72 prevents such overstressing. It has been found also that my steering apparatus greatly minimizes shocks on the steering wheel 14 due to the wheels of the vehicle striking holes and obstructions or the like.

While I have described and illustrated my steering mechanism in a form adaptable for use with a fifth wheel type vehicle it will be readily understood that it may be adapted with equal facility to a vehicle having dirigible wheels which are movable with respect to the frame of the vehicle. Another modification which may be made in my invention is to substitute electrical components for the hydraulic components described and illustrated herein. Other modifications likewise may be made in my invention, and it should be understood, therefore, that I intend to cover by the appended claims all modifications which fall within the true spirit and scope of my invention.

I claim:

1. In a vehicle power steering apparatus, a cylindrical pin member adapted to be non-movably mounted on a vehicle, an annular resilient member positioned around the said pin member, an annular solid member surrounding the said resilient member, a lever member pivotally mounted on the said annular solid member, an actuator operable by movement of the said annular solid member to a non-coaxial position with respect to the said cylindrical pin, and stop means associated with the said annular resilient member to limit the deformation thereof to a predetermined amount.

2. A vehicle power steering apparatus comprising, a cylindrical pin member adapted to be non-movably mounted on a vehicle, an annular resilient member positioned around the said pin member in contiguous relation therewith, an annular solid member surrounding the said resilient member, said solid member having inwardly extending flange portions at the ends thereof embracing the said annular resilient member, the inner diameter of the said flange portions being larger than the outer diameter of the said pin member whereby the said annular solid member may be moved to an eccentric position with respect to the said pin member by compressing the said annular resilient member, a lever member pivotally mounted about the said annular solid member, and a valve actuator operable by eccentric movement of the said annular solid member.

3. A steering apparatus for a vehicle comprising, a yieldable connection including a cylindrical member adapted to be non-movably mounted on a vehicle, a pivotable lever mounted on the said yieldable connection and arranged to pivot about an axis located centrally of the lever, an annular resilient member around the said cylindrical member in contiguous relation therewith and an annular solid member surrounding the said resilient member in abutting relation, the said pivotable lever being mounted coaxially with respect to the solid annular member and the axis of the said pivotable lever being movable eccentrically of the axis through the said cylindrical member by deformation of the said resilient portion, a vehicle steering member connected to one end of the said lever, an elongated valve actuator connected for operation by eccentric movement of the said solid annular member, the said valve actuator being in a neutral position when the axis of the said solid annular member coincides with the axis of the said cylindrical member, at least one fluid motor for steering the aforementioned vehicle, connections to two sources of fluid pressure, the said valve actuator being arranged to connect one source of fluid pressure to the said motor when the actuator is moved a predetermined amount in either direction from its neutral position and to connect both sources of fluid pressure to the fluid motor when the actuator is moved more than the said predetermined amount from the neutral position in either direction, whereby steering of the aforementioned vehicle at a relatively low speed is provided when the said valve actuator is moved in a selected direction less than the said predetermined amount and steering movement of the aforementioned vehicle at a higher rate is provided when the valve actuator is moved in the selected direction more than the predetermined amount.

References Cited in the file of this patent

UNITED STATES PATENTS

| 2,541,827 | Mosso et al. | Feb. 13, 1951 |
| 2,614,644 | Gustafson | Oct. 21, 1952 |

FOREIGN PATENTS

| 335,539 | Great Britain | Sept. 24, 1930 |
| 567,241 | Great Britain | Feb. 5, 1945 |
| 1,062,084 | France | Dec. 2, 1953 |